R. MUSSELMAN.
RESILIENT WHEEL.
APPLICATION FILED SEPT. 12, 1917.
1,289,517.
Patented Dec. 31, 1918.
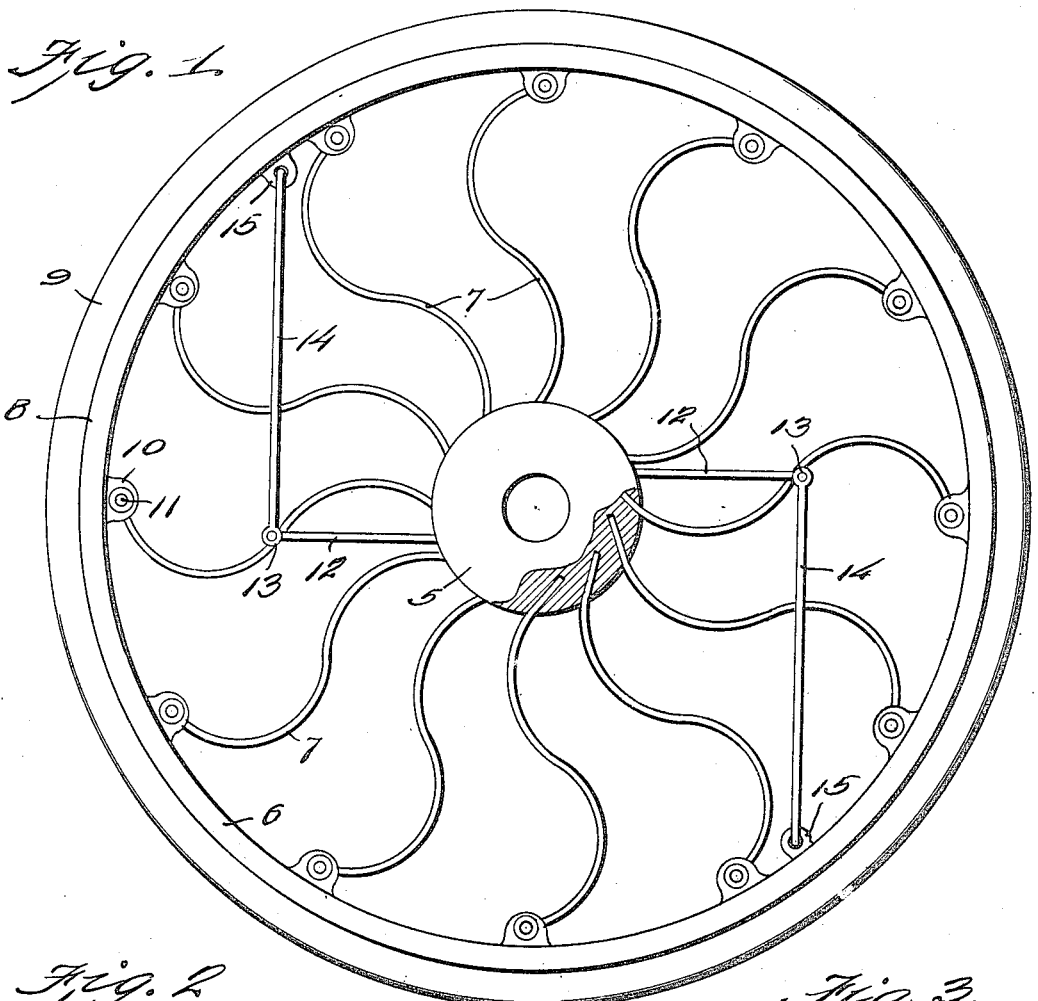
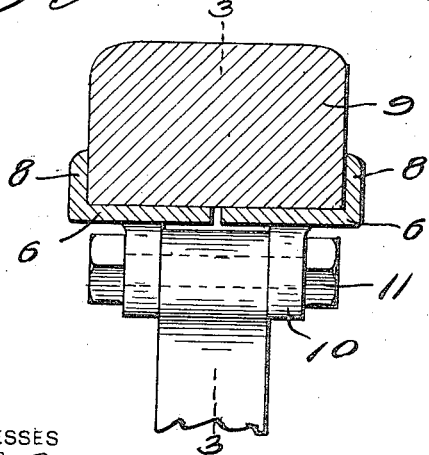
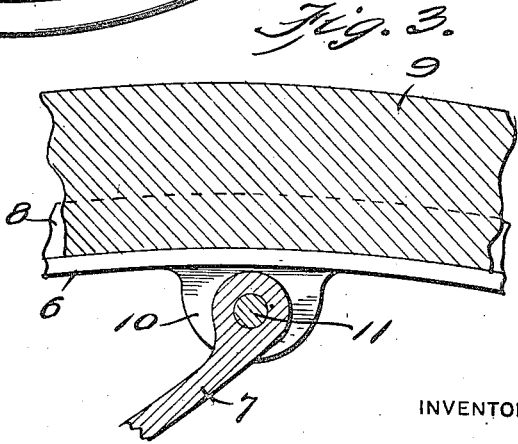
WITNESSES
INVENTOR
Robert Musselman
By
ATTORNEY

UNITED STATES PATENT OFFICE.

ROBERT MUSSELMAN, OF GALLATIN, MISSOURI.

RESILIENT WHEEL.

1,289,517.  Specification of Letters Patent.  Patented Dec. 31, 1918.

Application filed September 12, 1917.  Serial No. 191,067.

*To all whom it may concern:*

Be it known that I, ROBERT MUSSELMAN, a citizen of the United States, residing at Gallatin, in the county of Daviess and State of Missouri, have invented certain new and useful Improvements in Resilient Wheels, of which the following is a specification.

This invention relates generally to wheels, and particularly to resilient wheels for use in connection with motor vehicles, aiming primarily to generally simplify and improve the construction and operation of such wheels, as well as to increase the efficiency of the same.

A further object of the invention is to provide a resilient wheel of the type wherein spring spokes are employed so as to obviate the use of inflatable tires, and includes improved means for securing a cushioning member or tire to the rim of the wheel.

A further object of the invention resides in providing a device of this character which shall be of extremely simple and inexpensive construction, which has very few movable parts, which has its various elements so constructed and assembled as to minimize the opportunity for wear or breakage, and which includes a positive driving connection between the hub and rim, and which will prove thoroughly practical in use.

With these objects in view together with others which will appear as the description proceeds, the invention resides in the novel formation, combination, and arrangement of parts, all as will be described more fully hereinafter, illustrated in the drawings, and particularly pointed out in the claim.

In the drawings:—

Figure 1 is a side elevation, with parts broken away, of a resilient wheel constructed in accordance with the present invention.

Fig. 2 is an enlarged transverse sectional view taken through the tire and rim of the wheel and illustrating the manner in which the spokes are connected with the rim, and Fig. 3 is a fragmentary longitudinal sectional view taken upon line 3—3 of Fig. 2.

Referring now to the drawings, 5 indicates the hub and 6 the rim of the improved wheel, while 7 indicates the spring spokes connecting the rim and hub. The rim in the present instance comprises a pair of annular members of the proper diameter, each having at one end an outwardly projecting annular flange 8, and when these sections are properly assembled, they provide between them a channel for the reception of the tire indicated at 9. The tire may be formed of solid rubber or any other suitable material. The rim sections are capable of being separated from each other, and each is provided with a plurality of spaced inwardly projecting lugs 10 adapted to receive bolts 11, the said bolts effecting a connection between the rim sections.

Each of the spokes 7 is formed of a relatively thin metallic strap, having one end firmly affixed to the hub 5, and the opposite end rotatably mounted upon the bolts 11 connecting the lugs 10 of the rim. The spokes 7 are formed of spring metal, and are shaped in the manner shown in Fig. 1 so as to form a resilient connection between the rim and hub.

To provide a substantially positive driving connection between the hub and rim, the hub is provided with a pair of oppositely disposed arms 12, to the outer ends of which are pivoted as at 13 links 14, the said links being pivoted at their opposite ends to lugs 15 on the wheel rims. If desired, the arms 12 and links 14 may also be of spring material, so as to allow for movement between the rim and hub.

From the foregoing it is obvious that I have provided a spring wheel which is of extremely simple construction, and which will efficiently absorb the shocks to which the rim will be subjected when the vehicle is traveling. Should the tire 9 become worn, the bolts 11 may be removed, whereupon the rim sections can be separated to remove the old tire and to insert a new tire. While the structure including the arms 12 and links 14 insures a substantially positive driving connection between the hub and rim, the same will respond readily to relative movements between the hub and rim.

While the present is a disclosure of what is believed to be the preferred embodiment of the invention, it is to be understood that the invention is not limited thereto, as various changes in the minor details of construction, proportion, and arrangement of parts may be resorted to if desired without departing from the spirit of the invention as defined by the appended claim.

I claim:—

In combination, a wheel including a rim and a hub, flexible members connecting said hub and rim, spring arms firmly secured at their inner ends to the said hub and extending substantially tangentially from the bore thereof, a link pivoted to the outer end of each of said arms, the said links being normally disposed at right angles to their respective arms, and the opposite ends of the said links being pivotally connected with said rim.

In testimony whereof I affix my signature in presence of two witnesses.

ROBERT MUSSELMAN.

Witnesses:
B. H. GILLIHAN,
M. O. JOHNSON.